US012665363B2

(12) United States Patent
Zhong et al.

(10) Patent No.: US 12,665,363 B2
(45) Date of Patent: Jun. 23, 2026

(54) ELECTRICAL BUSWAY CONNECTOR ASSEMBLIES AND METHODS OF MANUFACTURING SAME

(71) Applicant: ABB Schweiz AG, Baden (CH)

(72) Inventors: Sheng Zhong, Hillsborough, NC (US); Darren Dale Tremelling, Apex, NC (US); Marius Rutkevičius, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 374 days.

(21) Appl. No.: 18/486,732

(22) Filed: Oct. 13, 2023

(65) Prior Publication Data

US 2025/0125569 A1 Apr. 17, 2025

(51) Int. Cl.
| *H01R 25/14* | (2006.01) |
| *H01R 43/20* | (2006.01) |
| *H02G 5/00* | (2006.01) |

(52) U.S. Cl.
CPC ........... H01R 25/145 (2013.01); H01R 43/20 (2013.01); H02G 5/007 (2013.01)

(58) Field of Classification Search
CPC ...... H01R 25/14; H01R 25/145; H01R 25/16; H01R 25/162; H01R 43/20; H01R 4/58; H02G 5/007
See application file for complete search history.

(56) References Cited

U.S. PATENT DOCUMENTS

| | | | | |
|---|---|---|---|---|
| 4,174,143 A | * | 11/1979 | Hicks, Jr. ............... | H02G 5/007 174/88 B |
| 9,071,028 B2 | * | 6/2015 | Falk ....................... | H01G 4/228 |
| 11,563,315 B2 | * | 1/2023 | Chen ...................... | H02G 5/007 |
| 2005/0233625 A1 | * | 10/2005 | Faulkner ............... | H02G 5/007 439/210 |
| 2011/0136362 A1 | * | 6/2011 | O'Leary ............... | H02G 5/007 174/88 B |
| 2012/0231668 A1 | * | 9/2012 | Byrne .................. | H01R 25/162 439/628 |

* cited by examiner

*Primary Examiner* — Oscar C Jimenez
(74) *Attorney, Agent, or Firm* — McCarter & English, LLP

(57) ABSTRACT

An electrical busway system including one or more busbar assemblies and one or more connector assemblies. Each busbar assembly includes a plurality of busbars. Each connector assembly includes a plurality of connector subassemblies fitted together within a clamp assembly. Each connector subassembly includes a conducting portion, an insulating portion surrounding an exterior of the conducting portion, and a channel proximate an interior of the conducting portion, the channel being configured to receive one of the plurality of busbars.

20 Claims, 8 Drawing Sheets

100

102

108

110      104

100

104

ELECTRICAL BUSWAY CONNECTOR ASSEMBLIES AND METHODS OF MANUFACTURING SAME

FIELD

The field of the disclosure relates generally to electrical power delivery, and more particularly, to an electrical busway connector assembly.

BACKGROUND

Electrical busway systems are used to distribute power from a power source to users. Known electrical busway systems include a connector assembly to join together electrically insulated busbars to form a continuous electrical system for power distribution. At least some known connector assemblies include a plurality of conductor plates and insulation plates compressed by a central bolt.

However, these known connector assemblies must be manually installed between busbars, with the central bolt manually tightened. Additionally, the insulation materials used to create these known connector assemblies may have to be customized depending on the use environment. Furthermore, these known connector assemblies include multiple electrical interfaces between the central bolt and each conductor plate, which may increase the risk of insulation failure, and thus electrical fault.

Accordingly, there is a need for an electrical busway connector assembly that is simpler to manufacture and install and that facilitates a reduced electrical fault risk.

BRIEF DESCRIPTION

In one aspect, an electrical busway system is provided. The electrical busway system includes one or more busbar assemblies and one or more connector assemblies. The one or more busbar assemblies include a plurality of busbars. The one or more connector assemblies include a plurality of connector subassemblies fitted together within a clamp assembly. Each connector subassembly includes a conducting portion, an insulating portion surrounding an exterior of the conducting portion, and a channel proximate an interior of the conducting portion, the channel being configured to receive one of the plurality of busbars.

In another aspect, a method of manufacturing an electrical busway system is provided. The method includes providing one or more busbar assemblies, each busbar assembly including a plurality of busbars. The method also includes molding one or more connector assemblies, each connector assembly including a plurality of connector subassemblies fitted together within a clamp assembly, wherein each connector subassembly includes a conducting portion, an insulating portion surrounding an exterior of the conducting portion, and a channel proximate an interior of the conducting portion, the channel being configured to receive one of the plurality of busbars. The method further includes fitting together the one or more busbar assemblies and the one or more connector assemblies by positioning one of the plurality of busbars within the channel of each connector subassembly.

BRIEF DESCRIPTION OF DRAWINGS

These and other features, aspects, and advantages of the present disclosure will become better understood when the following detailed description is read with reference to the accompanying drawings in which like characters represent like parts throughout the drawings.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figures 1A, 1B:
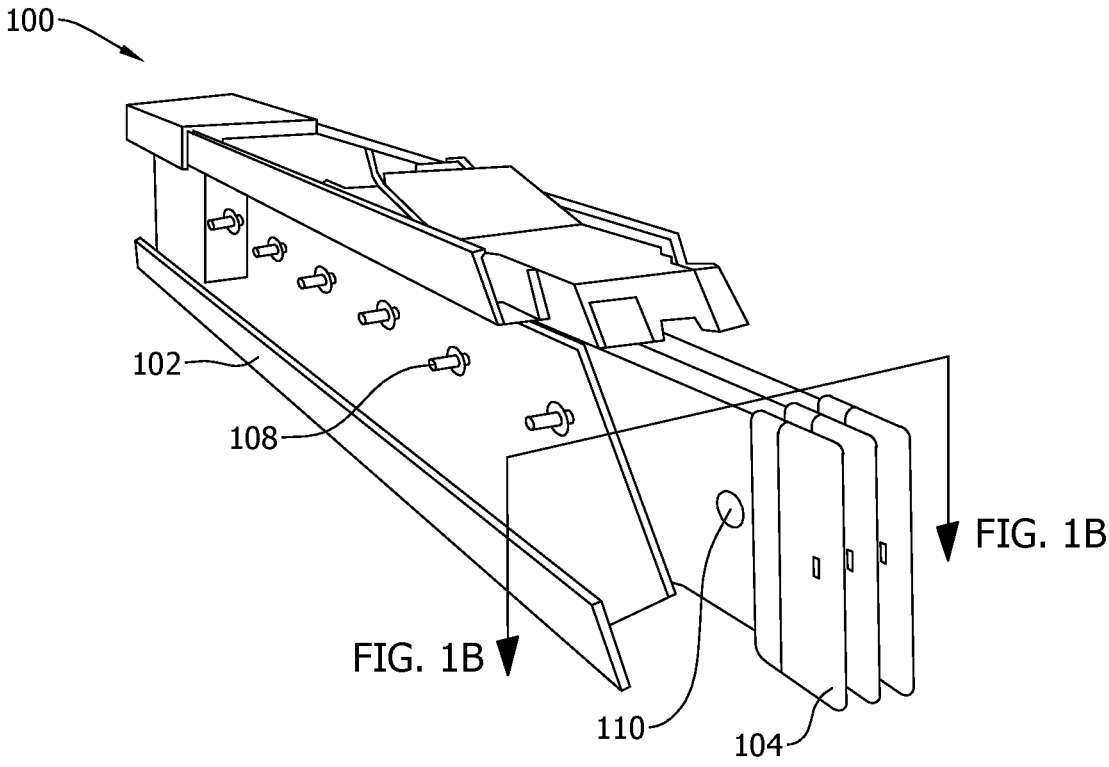
FIG. 1A is a perspective view of a busbar assembly for use in an electrical busbar system.
FIG. 1B is a cross-sectional view of the busbar assembly shown in FIG. 1A.

FIGS. 1A and 1B depict a busway assembly 100 for use in an electrical busway system. FIG. 1A is a perspective view of the busway assembly 100, and FIG. 1B is a cross-sectional view of the busway assembly 100. The busway assembly 100 includes a housing 102 and a plurality of busbars 104. The plurality of busbars 104 are enclosed in the housing 102. The housing 102 may be fabricated from aluminum. In the example embodiment, the busway assembly 100 includes three busbars 104, as shown in FIGS. 1A and 1B. In some embodiments, the busway assembly 100 may include more or fewer than the number of busbars 104 shown in FIGS. 1A and 1B. The busway assembly 100 includes one or more bolts 108 to secure the busbars 104 within the housing 102. The bolts 108 may be installed through one or more apertures 110 to assemble the busbars 104 within and to the housing 102. The apertures 110 are aligned laterally and are provided in a spaced apart configuration along the longitudinal length of the busbars.

Figure 2:
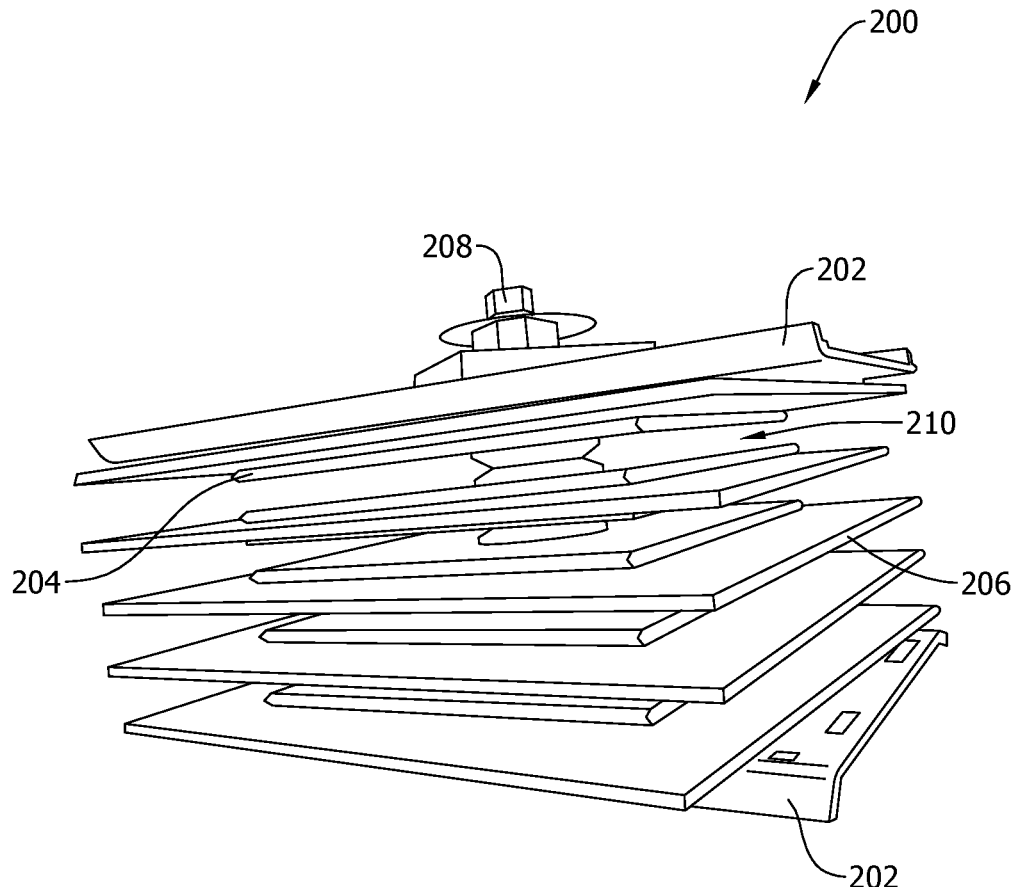
FIG. 2 is a perspective view of a known connector assembly for use in an electrical busbar system.

FIG. 2 is a perspective view of a connector assembly 200 as known in the prior art for use with the busway assembly 100, shown in FIGS. 1A and 1B. The connector assembly 200 includes a pair of connector housing members 202 on opposing ends of the connector assembly 200. Between the connector housing members 202, the connector assembly 200 includes a plurality of conductor plates 204 in a spaced apart configuration and a plurality of insulation plates 206 in a spaced apart configuration held together by a central bolt 208. In the example embodiment, the connector assembly 200 includes eight conductor plates 204 and five insulation plates 206, as shown in FIG. 2. In some embodiments, the connector assembly 200 may include more or less than the number of conductor plates 204 and/or insulation plates 206 shown in FIG. 2.

The conductor plates 204 and the insulation plates 206 are secured together between the connector housing members 202 by the central bolt 208. Generally, as known in the prior art, the connector assembly 200 is assembled manually, with an insulation plate 206 sandwiched between each pair of conductor plates 204. When used as part of an electrical busway system, the connector assembly 200 is inserted between a pair of busway assemblies 100. The connector assembly includes a busbar channel 210 defined between each pair of conductor plates 204 and, when the connector assembly 200 is inserted between a pair of busway assemblies 100, one of the plurality of busbars 104 is received within each busbar channel 210. The central bolt 208 is manually tightened to limit electrical and thermal resistance between adjacent busbars 104 and to maintain a required clamping force to connect the busway assemblies 100.

The connector assembly 200 including the central bolt 208 may require additional materials and manual labor for building and installation. Additionally, the material(s) used for the insulation plates 206 may need to be customized (e.g., varied) depending on the environment in which the connector assembly 200 is used. For example, the composition of a glass cloth based laminated epoxy material may need to be varied depending on whether the connector assembly 200 will be used in an indoor or outdoor environment. Furthermore, the connector assembly 200 includes multiple electrical interfaces between the central bolt 208 and each conductor plate 204, which may increase the risk of insulation failure, and thus electrical fault.

Figure 3:
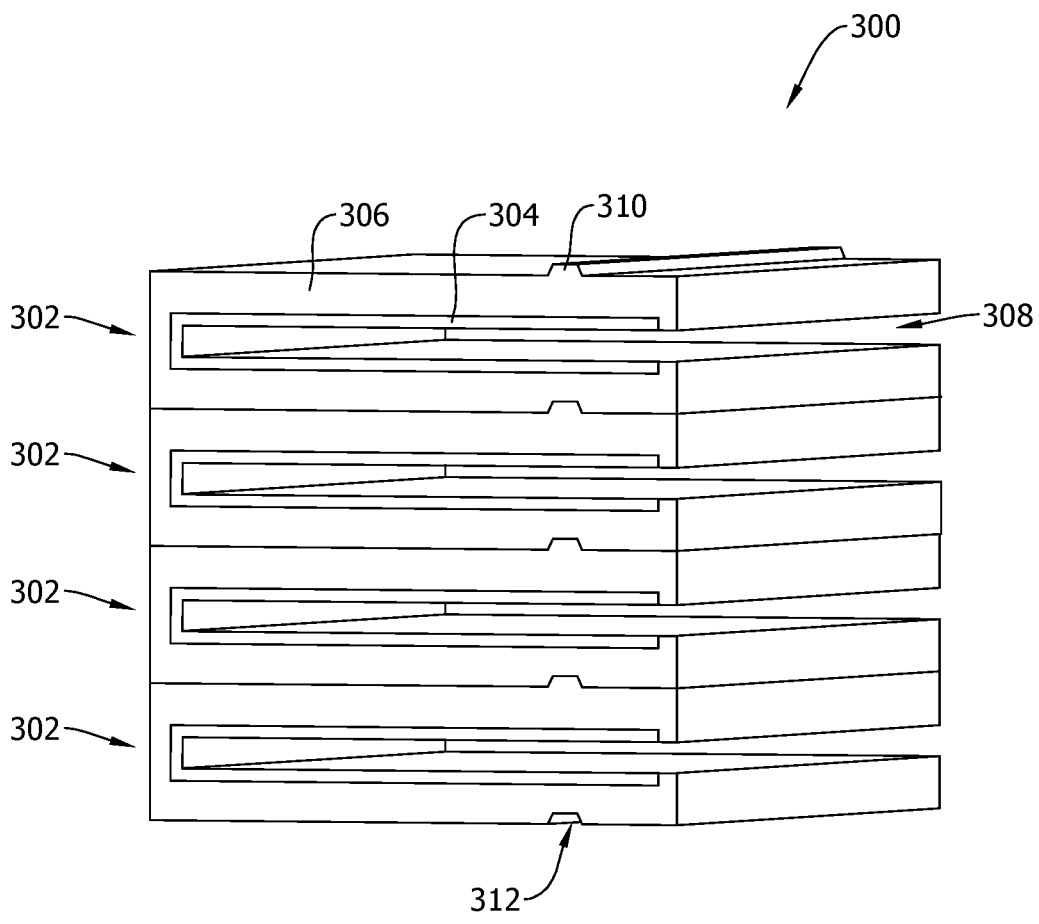
FIG. 3 is a side perspective view of a plurality of connector subassemblies forming a connector assembly for use in an electrical busbar system.
Figure 4:
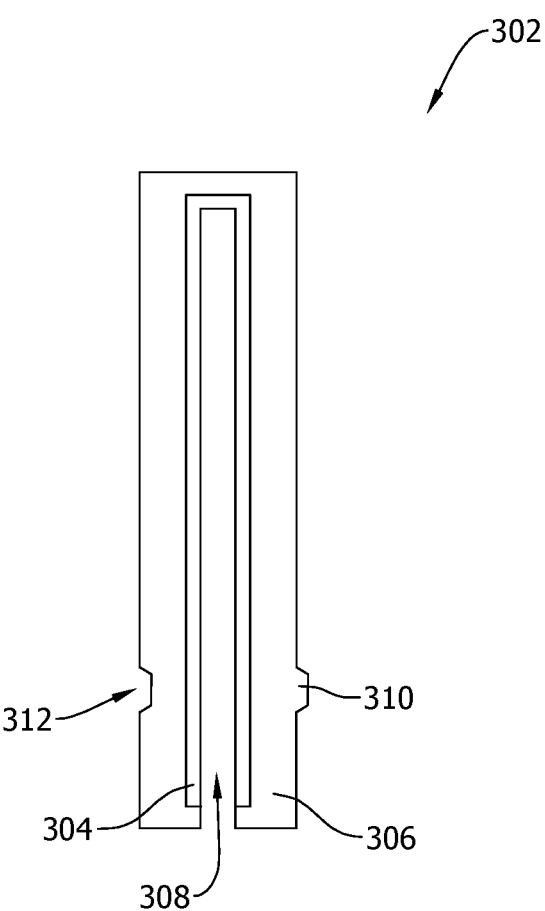
FIG. 4 is a side view of a connector subassembly used to form the connector assembly shown in FIG. 3.
Figure 5:
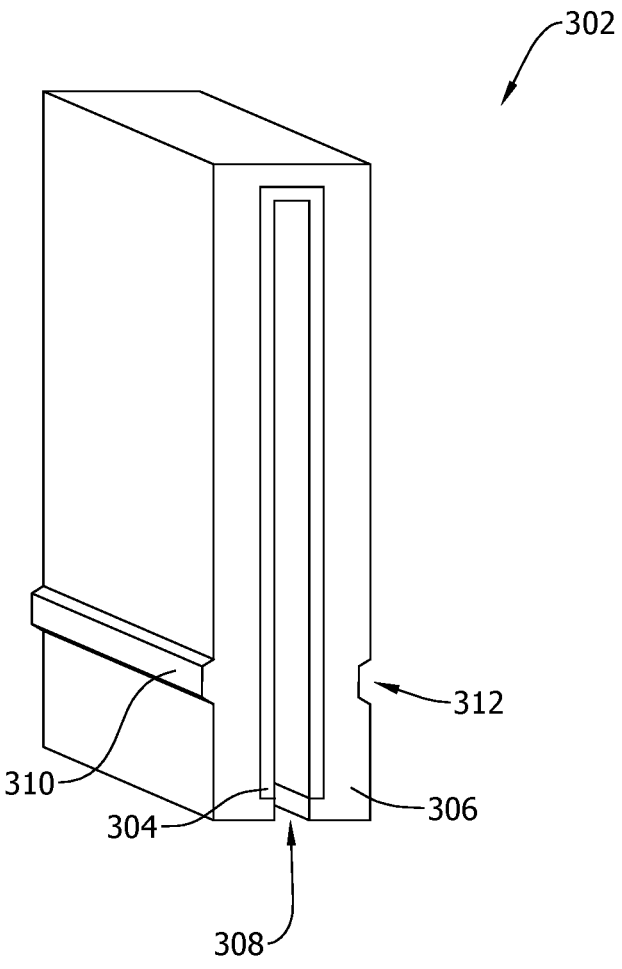
FIG. 5 is a side perspective view of the connector subassembly shown in FIG. 4.

FIG. 3 is a perspective side view of a connector assembly 300, including a plurality of connector subassemblies 302. FIG. 4 is a side view, and FIG. 5 is a perspective side view, of one of the plurality of connector subassemblies 302. As described herein, the connector subassembly 302, and thereby the connector assembly 300 including a plurality of connector subassemblies 302, facilitates a reduced electrical fault risk, in addition to being simpler to manufacture and install.

Figure 1B:
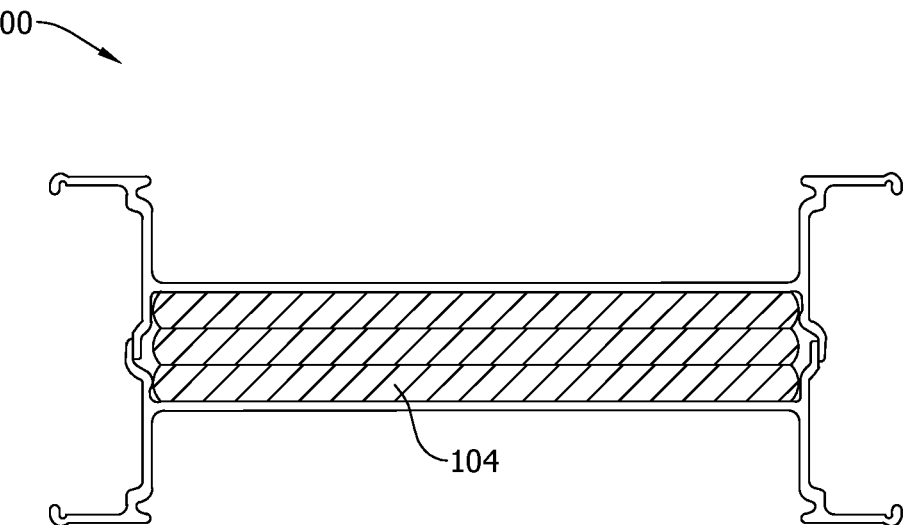

The connector subassembly 302 includes a conducting portion 304 encapsulated by an insulating portion 306. In the example embodiment, the conducting portion 304 is in a hairpin (e.g., long "U") shape along an interior of the connector subassembly 302 and the insulating portion 306 is over-molded around the conducting portion 304 along an exterior of the connector subassembly 302. The insulating portion 306 may be fabricated by injection molding, compression molding, transfer molding, extrusion, or potting. The connector subassembly 302 includes a channel 308 to receive one of the plurality of busbars 104 of the busbar assembly 100, thereby connecting the busbars 104 of adjacent busbar assemblies 100 (shown in FIG. 1) as shown in FIGS. 6A and 6B.

The connector subassembly 302 also includes a nesting member 310 and a nesting groove 312, to align adjacent connector subassemblies 302 when fitted together to form the connector assembly 300. The nesting member 310 and the nesting groove 312 are on opposing exterior sides of the connector subassembly 302. The nesting member 310 is integral with the insulating portion 306 and extends away from the conducting portion 304. The nesting groove 312 extends into the insulating portion 306 along the opposing side of the connector subassembly 302, extending towards the conducting portion 304. The nesting groove 312 receives the nesting member 310 of an adjacent connector subassembly 302 for a secure fit of connector subassemblies 302 to form the connector assembly 300 (shown in FIG. 3).

Figure 6A:
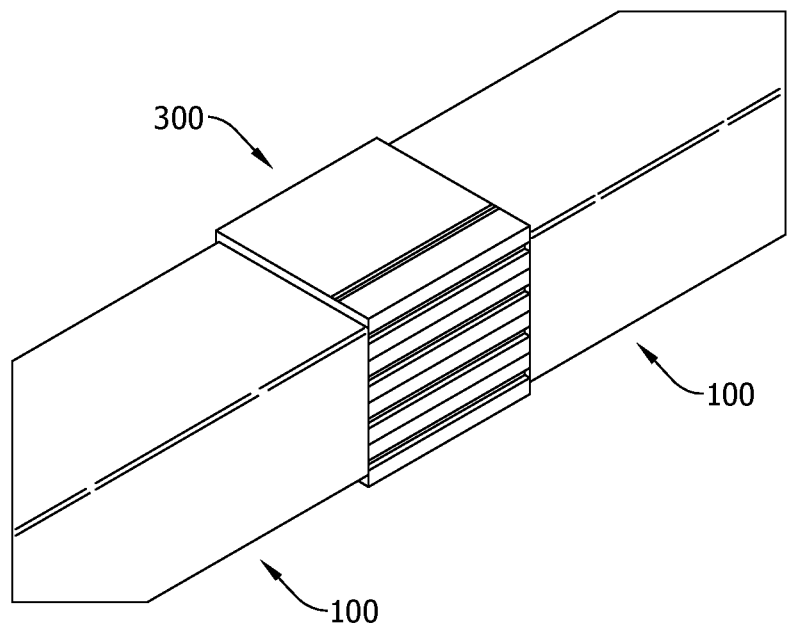
FIG. 6A is a back perspective view of the connector assembly shown in FIG. 3 connecting two busbars.
Figure 6B:
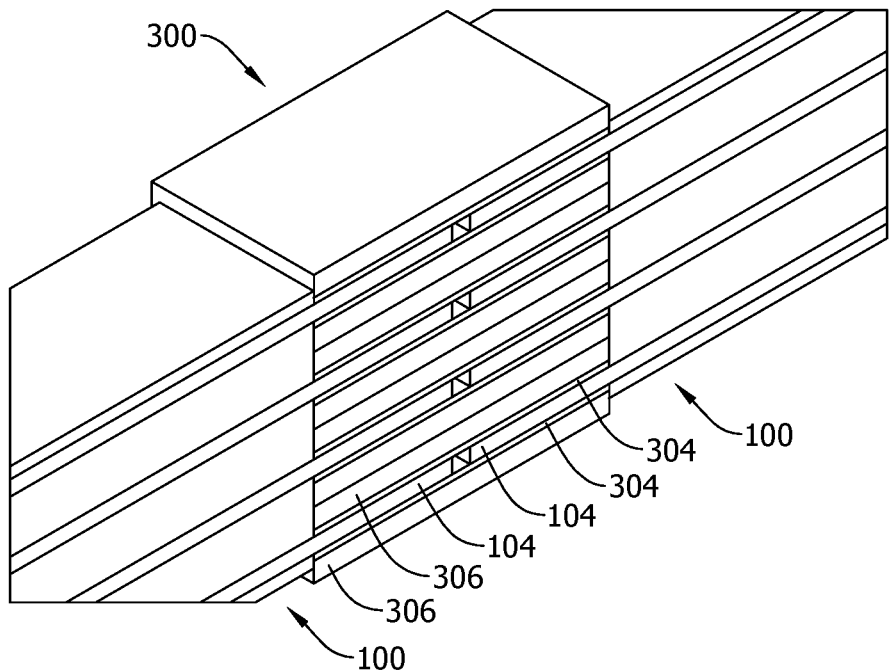
FIG. 6B is a cross-sectional perspective view of the connector assembly shown in FIG. 3 connecting two busbars.

FIG. 6A is a back perspective view, and FIG. 6B is a cross-sectional perspective view, of the connector assembly 300, connecting a pair of busbar assemblies 100 as part of an electrical busbar system. As shown in FIG. 6B, the busbars 104 of the busbar assemblies 100 are inserted into the channels 308 of the connector subassemblies 302, thereby electrically connecting the busbar assemblies 100 via the conducting portions 304 in contact with the busbars 104 on either side of the channels 308.

Figure 7A:
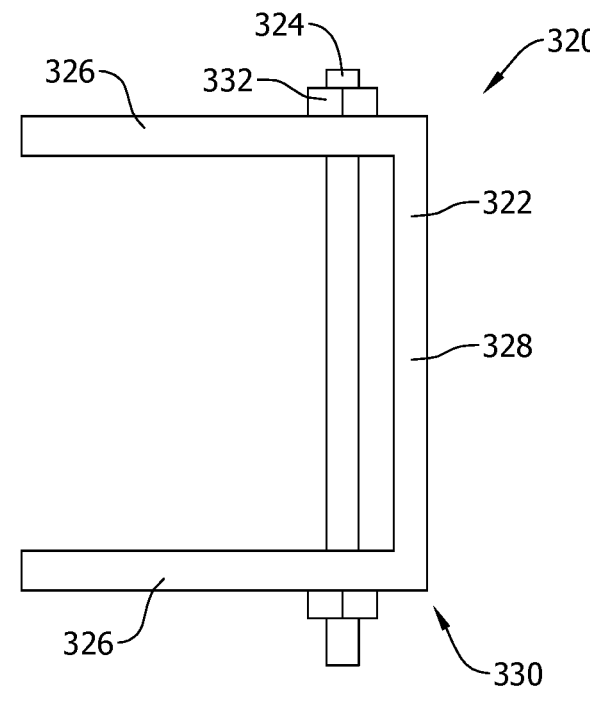
FIGS. 7A and 7B are side views of an assembly clamp for use with the connector assembly shown in FIG. 3.
Figure 7B:
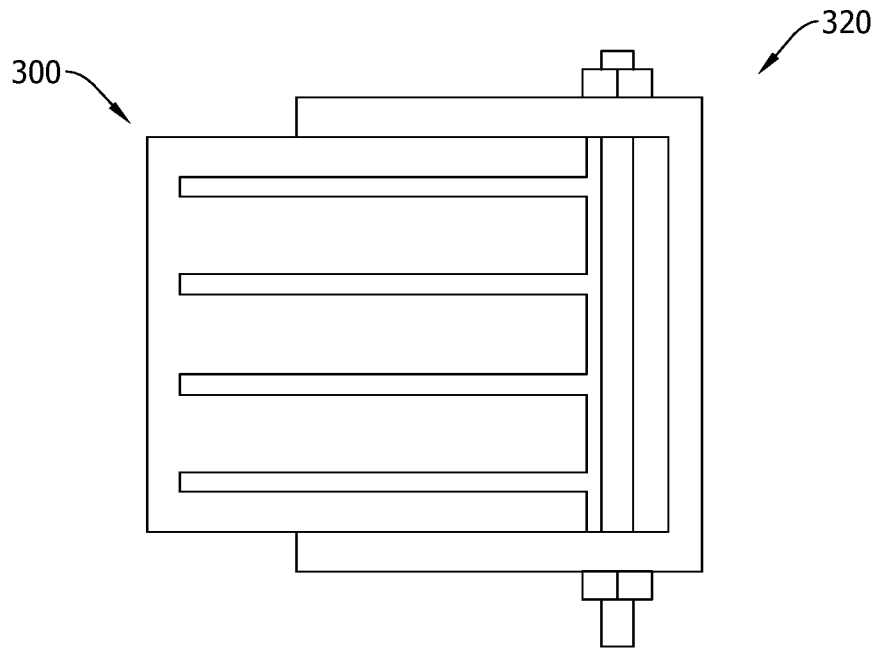

FIGS. 7A and 7B are side views of a clamp assembly 320 for use with the connector assembly 300. The clamp assembly 320 includes a body 322 and a clamping member 324. The body 322 includes a pair of longitudinal body members 326 connected by a lateral body member 328 at an end 330 of the longitudinal body members 326 to form a "C" shape. The longitudinal body members 326 are oriented parallel to the channels 308 of the connector subassemblies 302 forming the connector assembly 300. The lateral body member 328 is oriented substantially perpendicular to the longitudinal body members 326 to form the closed end of the "C" shape.

The clamping member 324 is oriented substantially parallel to the lateral body member 328 and extends through the longitudinal body members 326 proximate the end 330 for securing the clamp assembly 320 against the connector assembly 300. When the connector assembly 300 is inserted into the open end of the "C" shape of the body 322 of the clamp assembly 320, one or more fastening members 332 are tightened on ends of the clamping member 324 exterior to the body 322, clamping the longitudinal body members 326 together around the connector assembly 300. When the fastening members 332 are tightened, the clamp assembly 320 may maintain a substantially constant compression force (pound forces), such as, but not limited to, 5500 lbf. In some embodiments, the substantially constant compression force may be in a range of about 400 lbf to about 8000 lbf.

The connector assembly 300 improves upon the design and function of the connector assembly 200 in multiple ways. Firstly, less material and manual labor is required to fabricate the connector subassemblies 302 and form the connector assembly 300. For example, the body 322 of the clamp assembly 320 may be fabricated from a thermoset resin and/or a thermoplastic resin, via injection molding, compression molding, transfer molding, extrusion, or potting. The molding of the body 322 may be accomplished using a customizable mold assembly, via one or more exchangeable mold inserts, to form a desired geometry of the body 322, which may reduce the production cost of the clamp assembly 320. Additionally, for example, fitting together a plurality of connector subassemblies 302 via the nesting members 310 and the nesting grooves 312 may reduce the production time of the connector assembly 300.

Secondly, the shape of the clamp assembly 320 allows the clamp assembly 320 and the connector assembly 300 to be fitted together for use in both indoor and outdoor environments, thereby minimizing the need for customization of material(s) used for the connector assembly. For example, the shape of the body 322 of the clamp assembly 320 may reduce or substantially remove contact between the environment and the conducting portions 304 of the connector subassemblies 302. Thus, a single material may be used for the insulating portion 306, including, but not limited to, a thermoset insulation material (such as phenolics, EPDM, rubber, and/or epoxy, among others), for both indoor and outdoor use of the connector assembly 300.

Thirdly, the shape of the clamp assembly 320 allows the clamp assembly 320 and the connector assembly 300 to be fitted together without multiple electrical interfaces between the conducting portions 304 of the connector subassemblies 302 and the clamping member 324, thereby minimizing the risk of insulation failure and electrical fault.

An example technical effect of the systems and methods described herein includes one or more of: (a) simplified manufacture of an electrical busway connector assembly; (b) simplified installation of the electrical busway connector assembly between one or more busbar assemblies; and (c) reduced electrical fault risk between the electrical busway connector assembly and the one or more busbar assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical busway system, the electrical busway system comprising:
   one or more busbar assemblies, each busbar assembly comprising a plurality of busbars; and
   one or more connector assemblies, each connector assembly comprising a plurality of connector subassemblies fitted together within a clamp assembly,
   wherein each connector subassembly comprises a conducting portion, and an insulating portion encapsulating the conducting portion,
   wherein the conducting portion and the insulating portion of each connector subassembly define an interior channel, and
   wherein the interior channel is configured to receive one of the plurality of busbars.

2. The electrical busway system of claim 1, wherein the interior channel forms a hairpin shape.

3. The electrical busway system of claim 1, wherein the insulating portion of each connector subassembly comprises a nesting member and a nesting groove, the nesting member positioned to fit into the nesting groove of an insulating portion of an adjacent connector subassembly.

4. The electrical busway system of claim 1, wherein the clamp assembly comprises a pair of longitudinal body members connected by a lateral body member at an end of the longitudinal body members to form a c-shaped profile with an open end opposite the end of the longitudinal body members, the open end being oriented to receive the connector assembly between the longitudinal body members.

5. The electrical busway system of claim 4, wherein the clamp assembly further comprises a clamping member extending between the longitudinal body members substantially parallel to the lateral body member within the c-shaped profile and one or more fastening members proximate one or more ends of the clamping member for tightening the longitudinal body members together.

6. The electrical busway system of claim 5, wherein the clamp assembly is configured to maintain a substantially constant compression force of 5500 lbf.

7. The electrical busway system of claim 4, wherein at least one of the longitudinal body members and the lateral body member of the clamp assembly comprise one of a thermoset resin or a thermoplastic resin.

8. The electrical busway system of claim 7, wherein at least one of the longitudinal body members and the lateral body member of the clamp assembly is formed via one of injection molding, compression molding, transfer molding, extrusion, or potting.

9. The electrical busway system of claim 8, wherein the compression molding comprises a customizable mold assembly with one or more exchangeable mold inserts to form a desired geometry of the clamp assembly.

10. The electrical busway system of claim 1, wherein the insulating portion of each connector subassembly comprises a thermoset insulation material configured for use within an indoor environment and an outdoor environment.

11. The electrical busway system of claim 10, wherein the thermoset insulation material comprises one of a phenolic thermoset material, an EPDM material, a rubber material, or an epoxy.

12. A method of manufacturing an electrical busway system, the method comprising:
    providing one or more busbar assemblies, each busbar assembly comprising a plurality of busbars;
    molding one or more connector assemblies, each connector assembly comprising a plurality of connector subassemblies fitted together within a clamp assembly, wherein:
      each connector subassembly comprises a conducting portion, and an insulating portion encapsulating the conducting portion,
      the conducting portion and the insulating portion of each connector subassembly define an interior channel, and
      the interior channel is configured to receive one of the plurality of busbars; and
    fitting together the one or more busbar assemblies and the one or more connector assemblies by positioning the one of the plurality of busbars within the interior channel of each connector subassembly.

13. The method of claim 12, wherein the interior channel forms a hairpin shape.

14. The method of claim 12, wherein fitting together the plurality of connector subassemblies comprises fitting a nesting member of the insulating portion of each connector subassembly into a nesting groove of an insulating portion of an adjacent connector subassembly.

15. The method of claim 12, wherein molding the one or more connector assemblies comprises forming the clamp assembly by connecting a lateral body member at an end of a pair of longitudinal body members to form a c-shaped profile with an open end opposite the end of the longitudinal body members.

16. The method of claim 15, wherein fitting together the one or more busbar assemblies and the one or more connector assemblies comprises orienting the open end of the c-shaped profile of the clamp assembly to receive the connector assembly between the longitudinal body members.

17. The method of claim 12, wherein molding the one or more connector assemblies comprises forming the clamp assembly via one of injection molding, compression molding, transfer molding, extrusion, or potting.

18. The method of claim 17, wherein the compression molding comprises using a customizable mold assembly with one or more exchangeable mold inserts to form a desired geometry of the clamp assembly.

19. The method of claim 12, wherein providing the one or more connector assemblies comprises providing the insulating portion of each connector subassembly comprising a thermoset insulation material configured for use within an indoor environment and an outdoor environment.

20. The method of claim 19, wherein providing the insulating portion of each connector subassembly comprising the thermoset insulation material comprises one of a phenolic thermoset material, an EPDM material, a rubber material, or an epoxy.

* * * * *